Jan. 18, 1938.  W. J. BUTLER  2,105,582
MACHINE FOR THE MANUFACTURE OF CARTONS AND THE LIKE
Filed Dec. 1, 1936  13 Sheets-Sheet 2

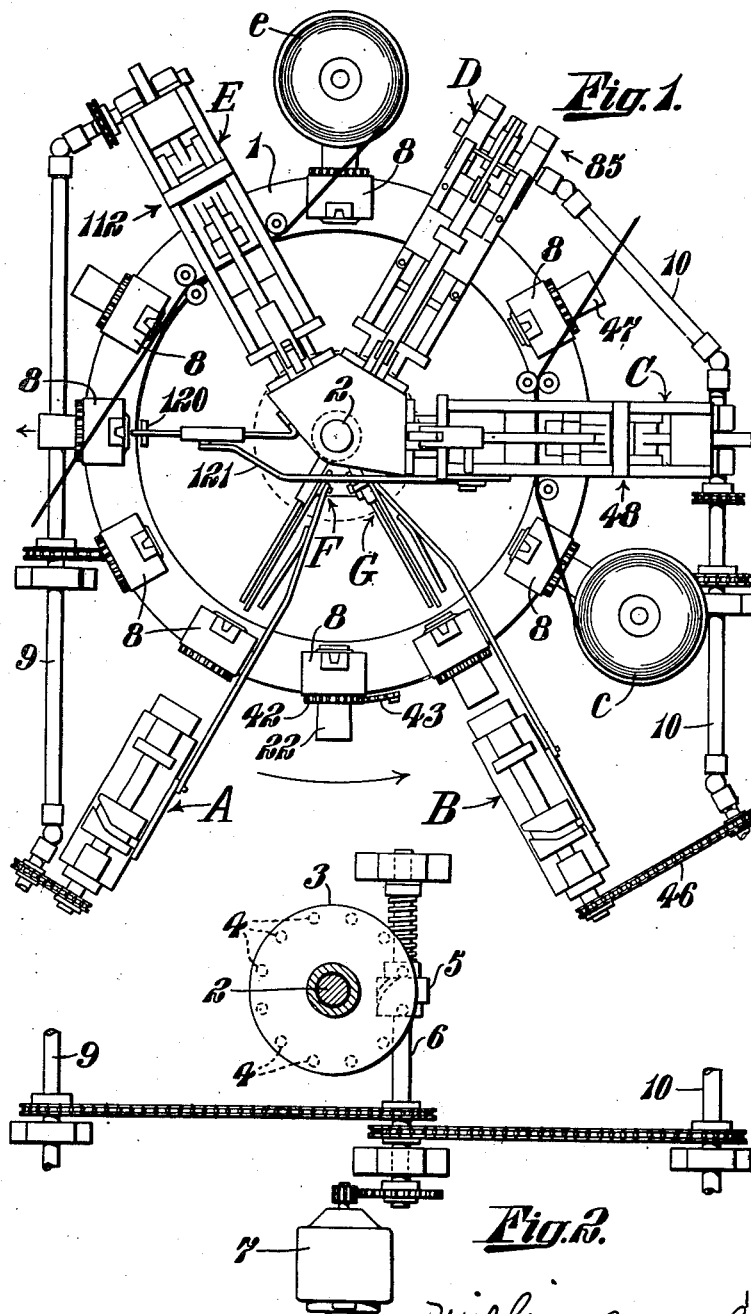

INVENTOR
William Joseph Butler
BY
Blinger
ATTORNEY

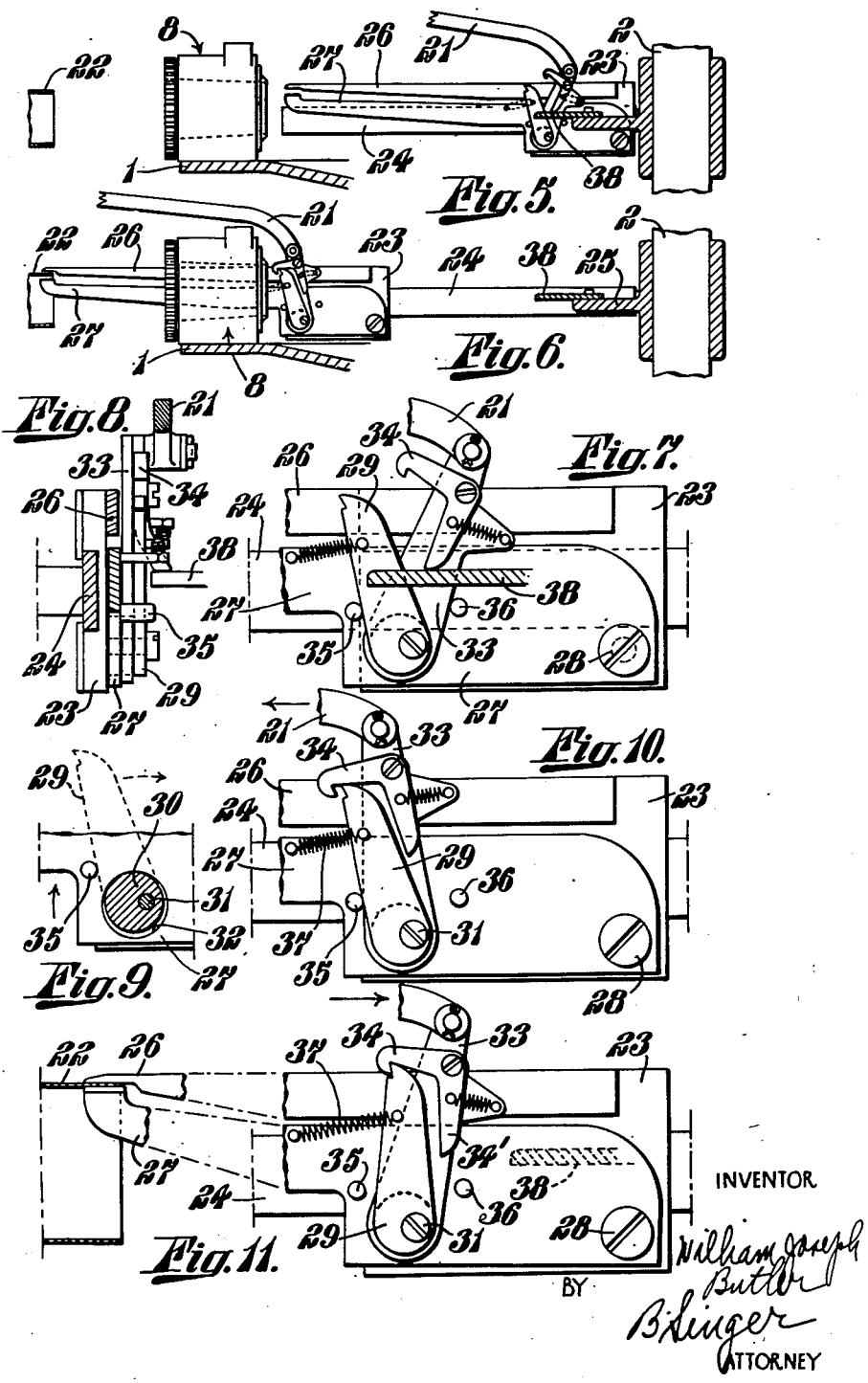

Jan. 18, 1938.  W. J. BUTLER  2,105,582
MACHINE FOR THE MANUFACTURE OF CARTONS AND THE LIKE
Filed Dec. 1, 1936  13 Sheets-Sheet 4

INVENTOR
William Joseph Butler
BY
ATTORNEY

Jan. 18, 1938.　　　　W. J. BUTLER　　　　2,105,582
MACHINE FOR THE MANUFACTURE OF CARTONS AND THE LIKE
Filed Dec. 1, 1936　　　13 Sheets-Sheet 5

INVENTOR
William Joseph Butler
BY B. Singer
ATTORNEY

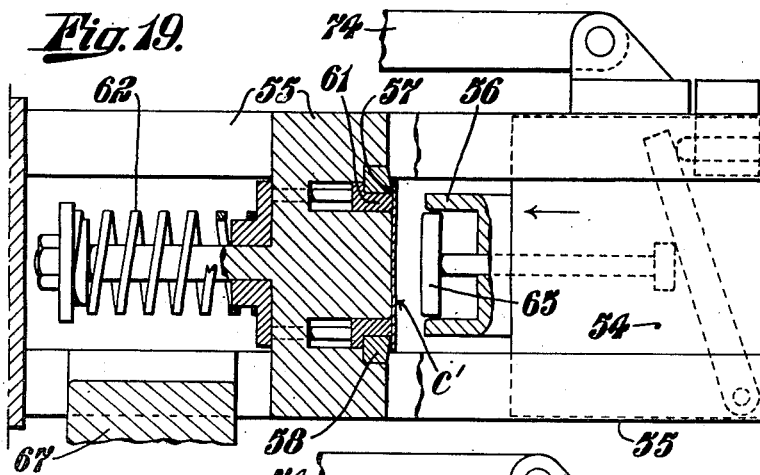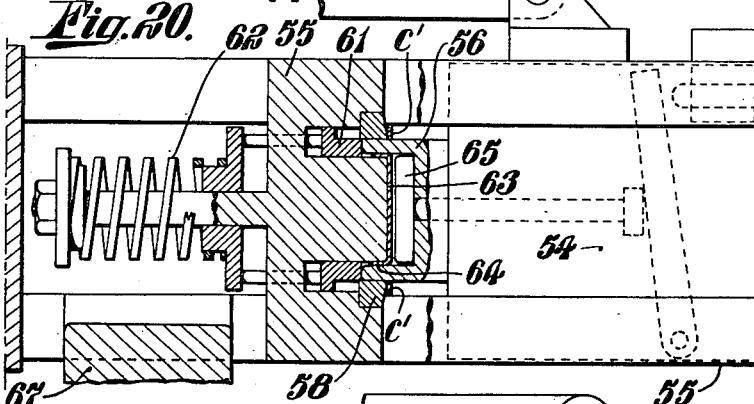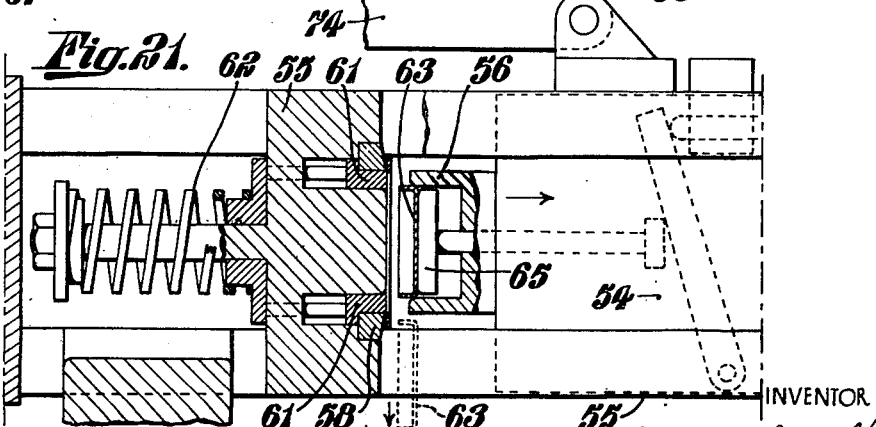

William Joseph Butler INVENTOR
BY B. Singer
ATTORNEY

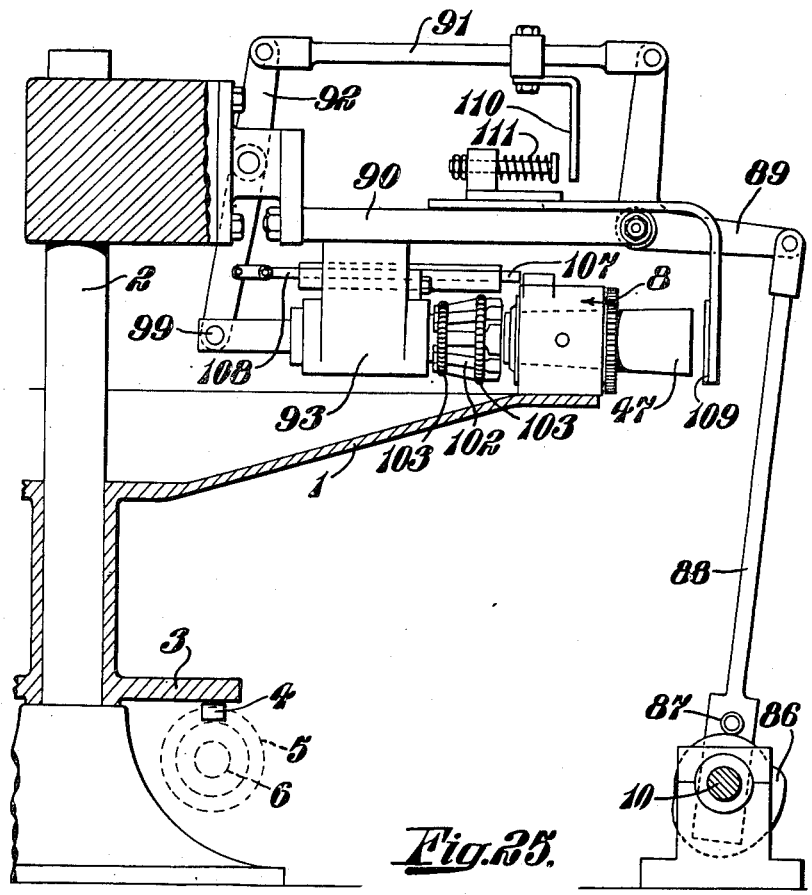
Fig. 25.
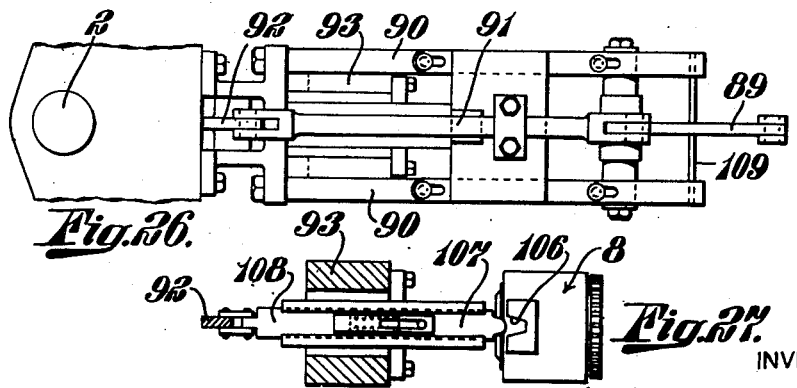
Fig. 26.
Fig. 27.

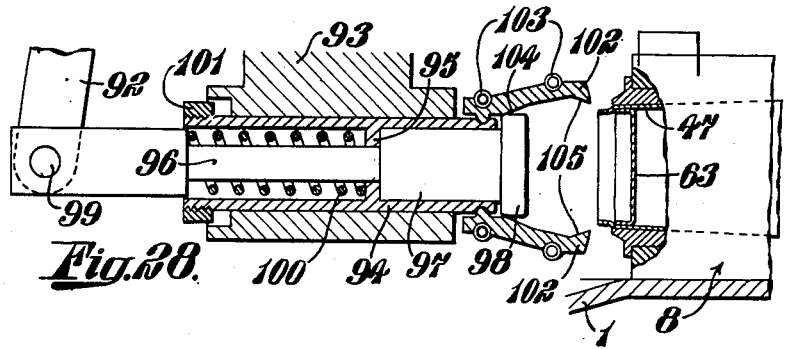
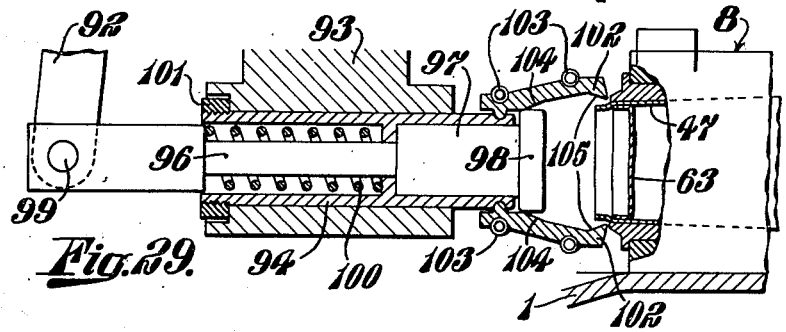
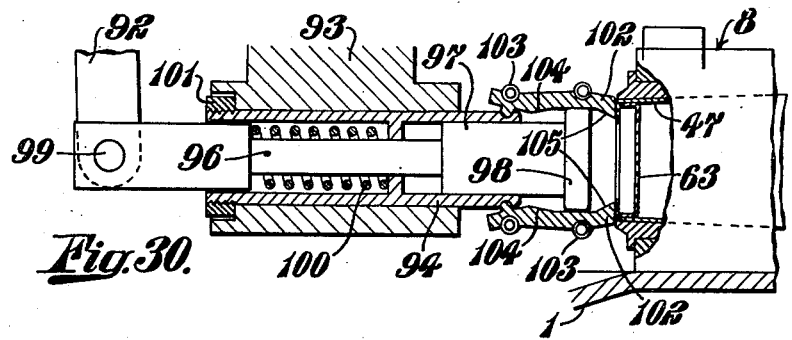
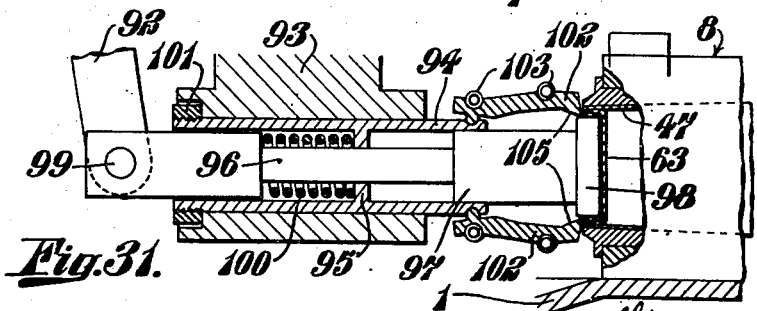

Jan. 18, 1938. W. J. BUTLER 2,105,582
MACHINE FOR THE MANUFACTURE OF CARTONS AND THE LIKE
Filed Dec. 1, 1936 13 Sheets-Sheet 10

INVENTOR
William Joseph Butler
BY B. Singer
ATTORNEY

Jan. 18, 1938.  W. J. BUTLER  2,105,582
MACHINE FOR THE MANUFACTURE OF CARTONS AND THE LIKE
Filed Dec. 1, 1936  13 Sheets-Sheet 11

INVENTOR
William Joseph Butler
BY B. Singer
ATTORNEY

Jan. 18, 1938.  W. J. BUTLER  2,105,582
MACHINE FOR THE MANUFACTURE OF CARTONS AND THE LIKE
Filed Dec. 1, 1936  13 Sheets—Sheet 12

INVENTOR
William Joseph Butler
BY
ATTORNEY

Jan. 18, 1938.  W. J. BUTLER  2,105,582
MACHINE FOR THE MANUFACTURE OF CARTONS AND THE LIKE
Filed Dec. 1, 1936  13 Sheets-Sheet 13

INVENTOR
William Joseph Butler
BY
ATTORNEY

Patented Jan. 18, 1938

2,105,582

UNITED STATES PATENT OFFICE 2,105,582

MACHINE FOR THE MANUFACTURE OF CARTONS AND THE LIKE

William Joseph Butler, Bickley, England, assignor to Kleentainers (British & Overseas) Ltd., Bromley, England, a British company Application December 1, 1936, Serial No. 113,717
In Great Britain June 24, 1936

7 Claims. (Cl. 93—39.3)

This invention relates to machines for use in manufacturing cartons and the like, which machines may be of an automatic or semi-automatic nature, and has for its object to provide such machines which readily will manufacture cartons from paper, cardboard, or other similar material in sheet or strip form.

In general, machines according to the invention for use in manufacturing cartons from sheet and/or strip material include in combination automatically operating means for forming a tubular member from such material and automatically operating means for inserting a base member, which is also formed from such sheet or strip material, into the tubular member and causing the retention of said base member. It is preferable that the machine include means whereby the tubular member can be automatically transferred from the position at which it itself is produced to the position which it is adapted to receive the base member, so that the manufacture of cartons can be effected entirely automatically; paper, cardboard or other suitable material in sheet and/or strip form being supplied to the machine from which latter the completed articles in the form of cartons are delivered. Such delivery may be effected on to a suitable conveyor or the like and thence the cartons may if desired pass to apparatus in which they are waxed and subsequently dried.

In preferred embodiments of the invention the machine includes a rotatable or otherwise movable table, platform or the like adjacent which the various automatically operating mechanisms are arranged in fixed spaced apart relationship, whilst means are provided whereby the movement of the table or the like functions to transfer the partially manufactured cartons stage by stage into positions permitting each mechanism to perform its allotted function until the formation of the article is completed.

Machines according to the invention are suitable for use in producing cartons and the like of various forms. For instance the base of the carton may have any suitable shape, for example circular, elliptical, square, rectangular or otherwise, whilst the body portion of tubular form may consist of a single thickness or may comprise more than one thickness, for example two thicknesses provided by a pair of tubular members arranged one within the other. Furthermore the base may comprise a single inserted member, such for example as a flanged disc or more than one such device. Preferably this disc or these discs, especially by the flange or their flanges, are intimately associated with the turned round end of the body portion. In addition the said body portion may have a section from base to top which is uniform or may converge or diverge, in which latter case, which is a preferable construction, the completed cartons can be readily nested one within the other for ease in transport. Still further the lower ends or bases of the cartons may, when the said cartons are empty, have a formation so that they come in a plane or the construction may be similar to that described in my British Patent No. 464,869/1935 (corresponding to United States application Ser. No. 108,075).

It will of course be understood that machines according to the invention can have many constructional forms and that the precise form and arrangement of the various mechanisms and their co-operating parts can be such as to meet particular requirements.

However, in order that the invention can be more fully appreciated one preferred practical embodiment thereof will now be described in detail with reference to the accompanying sheets of drawings.

These drawings serve to illustrate in various ways, as will be identified during the course of the description, two automatic machines for use in the manufacture of cartons suitable for containing milk or other liquid, from paper in sheet or strip form. The cartons produced by these two particular machines have a body portion comprised by a two-part composite tubular member of circular cross section which diverges from the base to the top or open end and is provided with two base members in the form of flanged discs.

Fig. 1 of the accompanying drawings illustrates somewhat diagrammatically and in plan, the general arrangement of one preferred embodiment of the invention.

Fig. 2 shows in a similar manner to Fig. 1 a portion of the driving mechanism of this particular machine.

Fig. 5 is a side elevation of draw-off mechanism to be hereinafter described, the mechanism being shown in its normal position of rest.

Fig. 6 is a similar view to Fig. 5 but showing the mechanism in an advanced position.

Fig. 7 is a side elevation of a portion of the mechanism shown in Fig. 5.

Figures 12, 13:
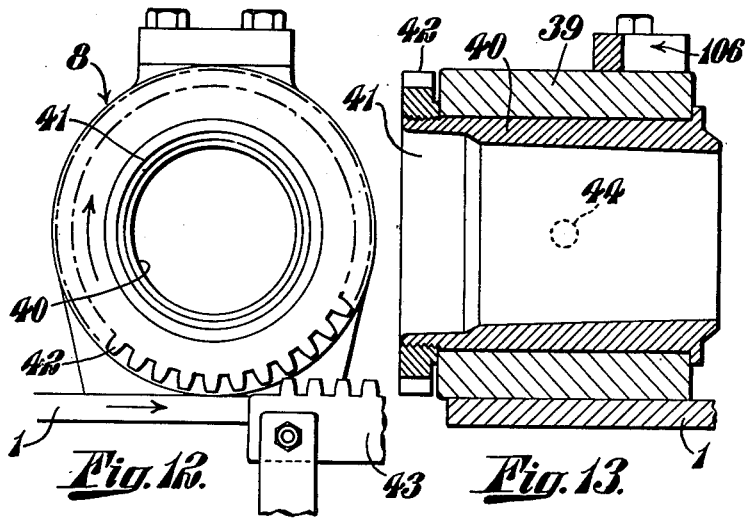
Figure 14:
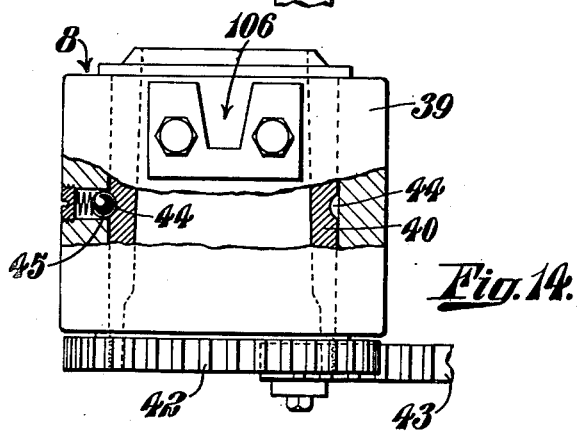
Figures 15, 16:
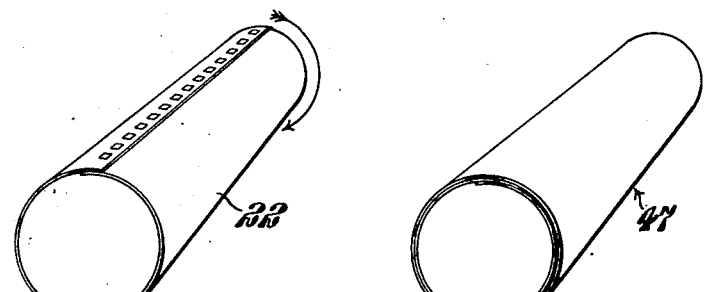
Figure 17:
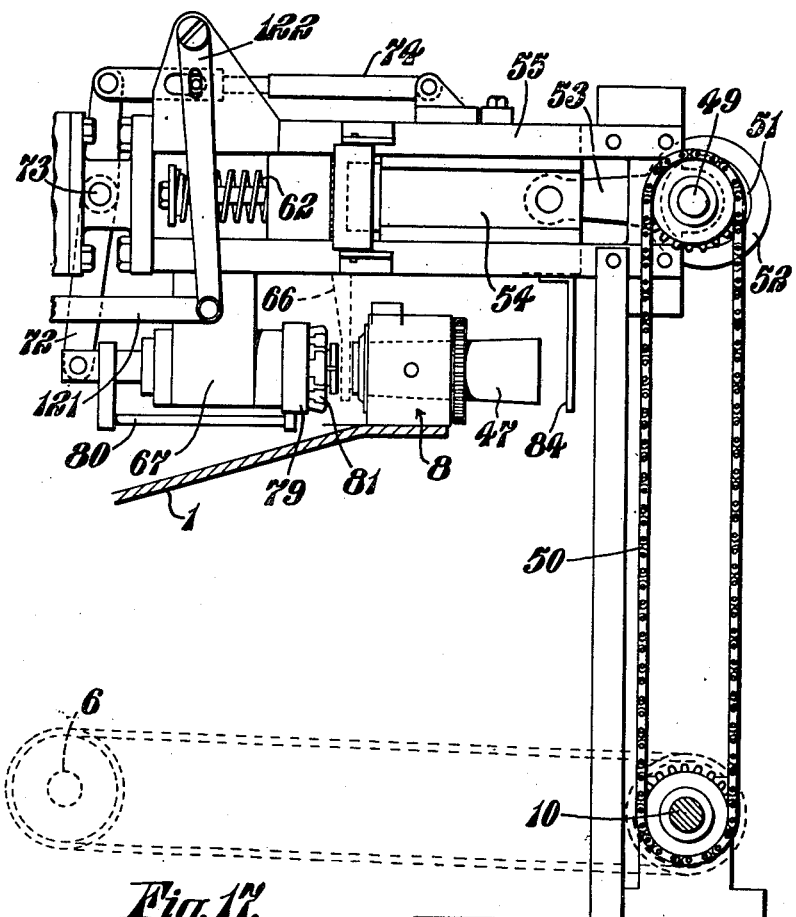
Figure 18:
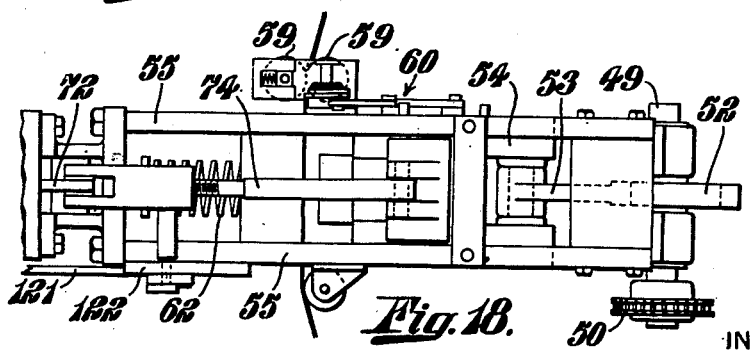
Figure 22:
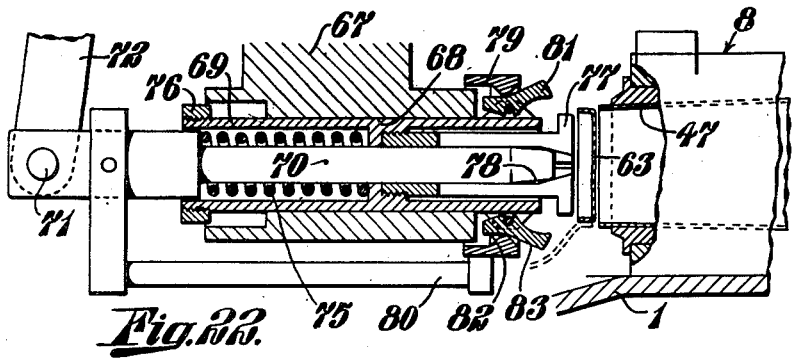
Figure 23:
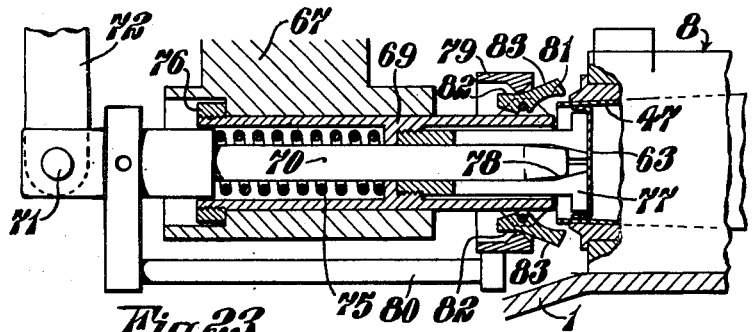
Figure 24:
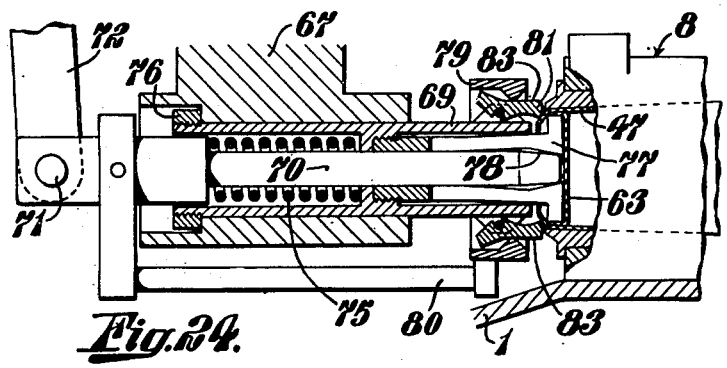
Figure 32:
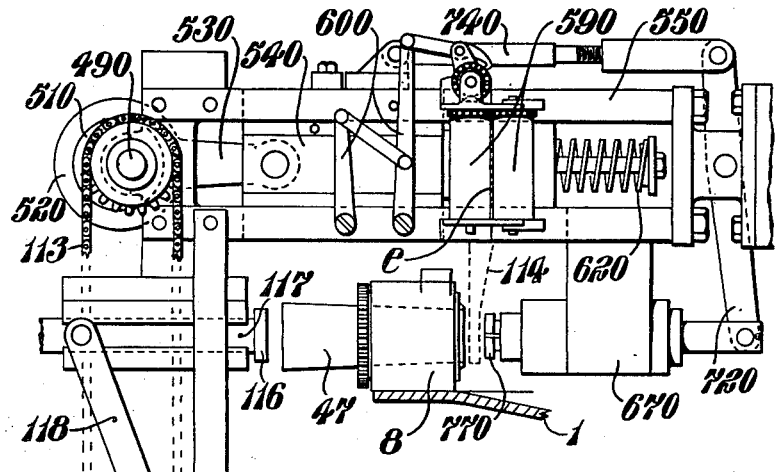
Figure 34:
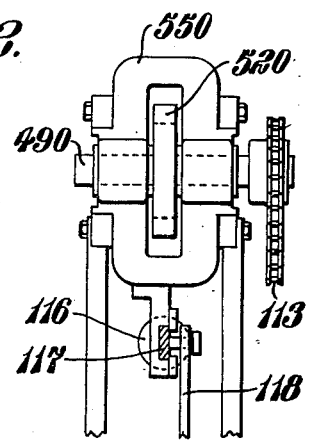
Figure 33:
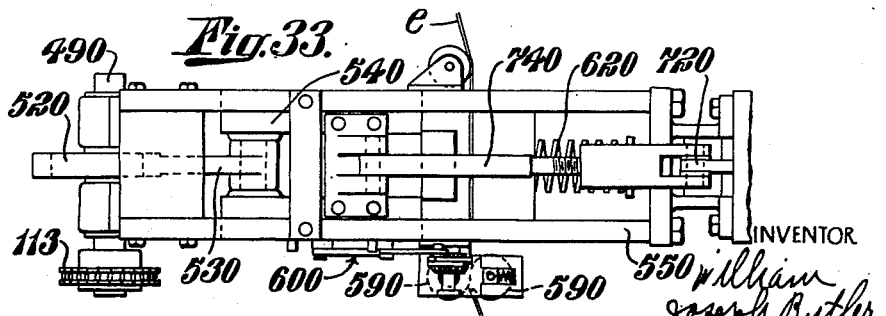
Figure 35:
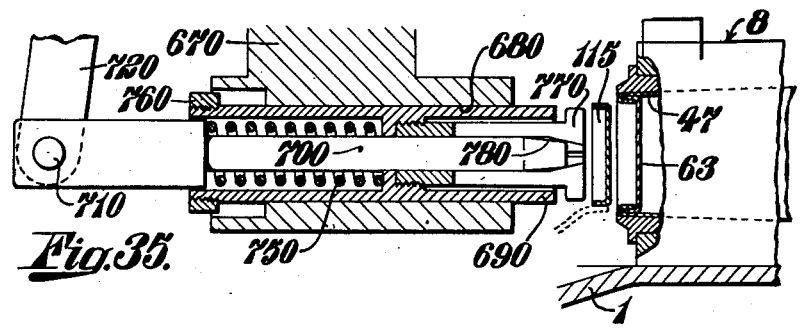
Figure 36:
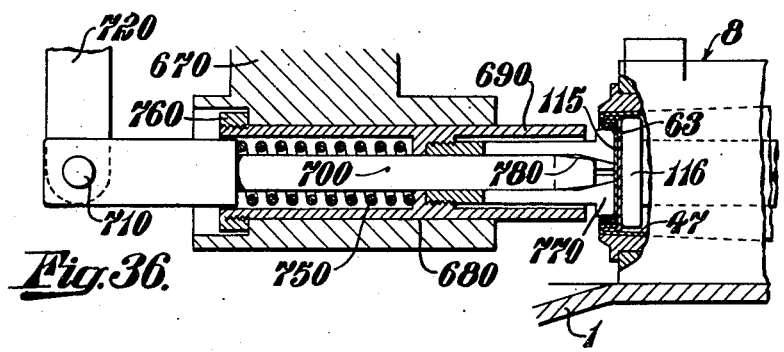
Figure 37:
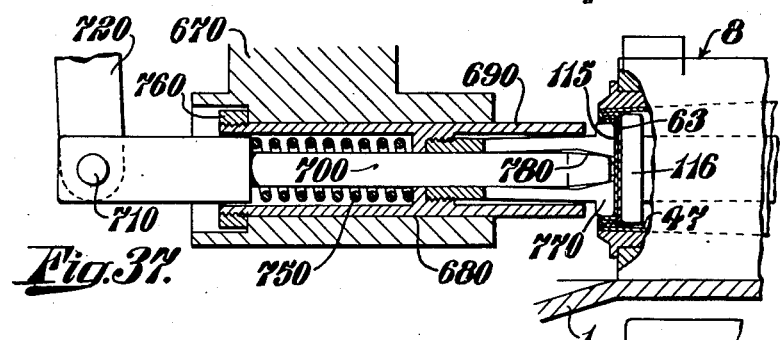
Figure 38:
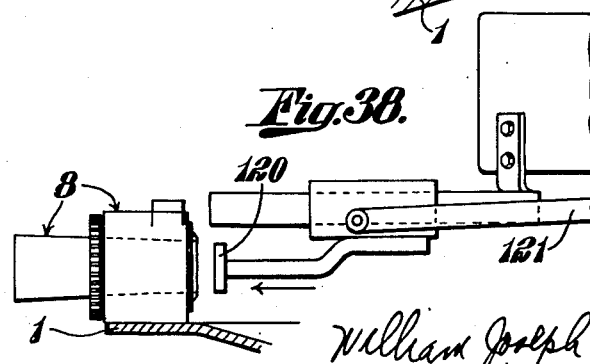
Figure 39:
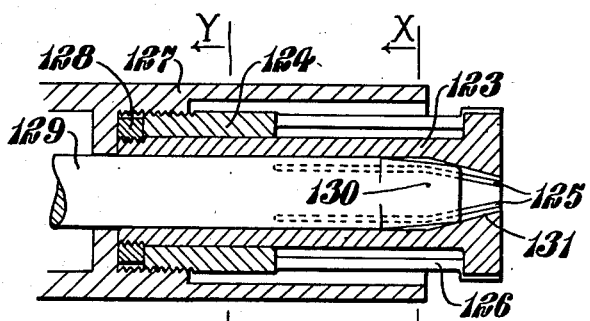
Figure 40:
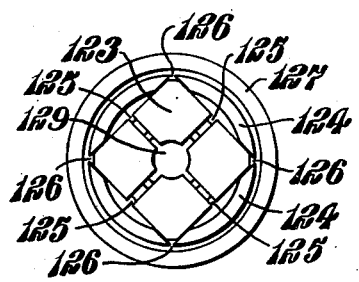
Figure 41:
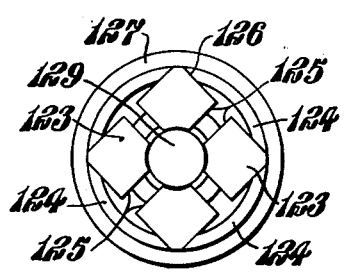
Figure 42:
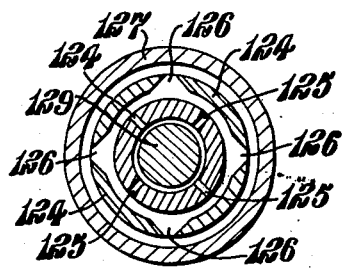
Figure 43:
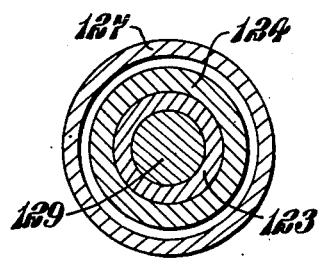
Figure 44:
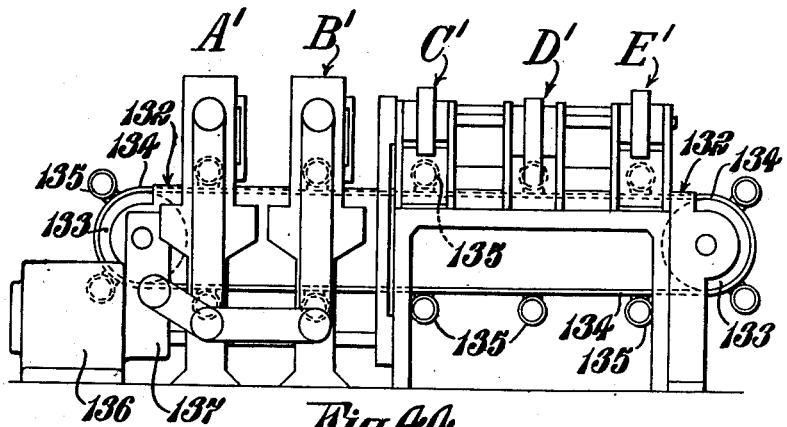
Figure 45:
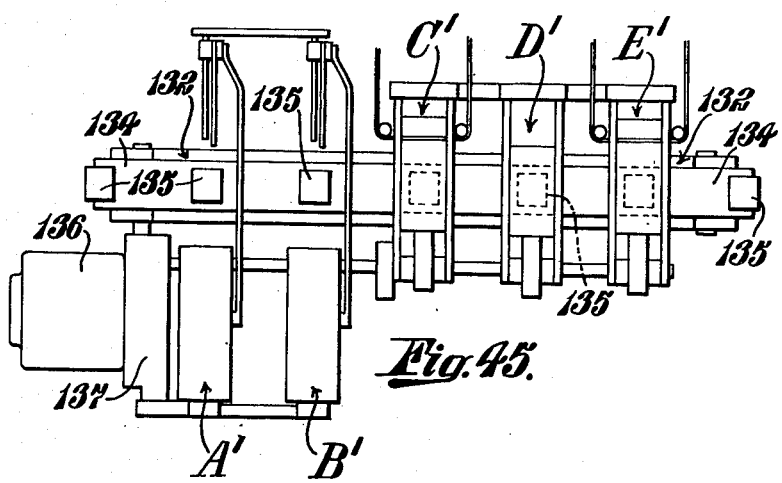

Fig. 8 is a cross sectional elevation of Fig. 7.
Fig. 9 is a detail view of a portion of Fig. 7.
Fig. 10 is a side elevation of a portion of Fig. 6.
Fig. 11 is a similar view to Fig. 10 but with the parts in another position.
Fig. 12 is a front elevation of a hollow receptacle hereinafter to be more particularly described.
Fig. 13 is an axial section of Fig. 12.
Fig. 14 is a plan view, partly in section of Fig. 12.
Fig. 15 is a perspective view of a tapered tubular member formed from paper sheet.
Fig. 16 is a perspective view of a two-part composite tubular member formed from paper sheet.
Fig. 17 shows in side elevation looking in the direction of the arrow 48 (Fig. 1) mechanism for automatically producing flanged disc base members from strip paper and inserting one of such base members into one end portion of a composite tubular member as hereinafter to be fully described.
Fig. 18 is a plan view of a portion of the mechanism shown in Fig. 17.
Figs. 19, 20 and 21 show in axial sectional elevations various parts of the mechanism for automatically producing flanged disc base members at different stages of operation.
Figs. 22, 23 and 24 show in axial section various parts of the mechanism adapted automatically to insert a flanged disc base member into one end of a composite tubular member, the figures showing various parts of the mechanism in three different positions during their operation respectively.
Fig. 25 shows an elevational view looking in the direction of the arrow 85 (Fig. 1) of mechanism for automatically causing the complete retention of flanged disc base members in the composite tubular members as will be hereinafter fully described.
Fig. 26 is a plan view of Fig. 25.
Fig. 27 is a detail sectional plan view of a portion of the mechanism shown in Fig. 25.
Figs. 28–31 show to an enlarged scale and in axial section various parts of the mechanism shown in Fig. 25, the various parts being shown in four different positions of operation respectively.
Fig. 32 shows a side elevational view, looking in the direction of the arrow 112 (Fig. 1) of mechanism adapted automatically to produce further flanged disc members from paper strip.
Fig. 33 shows a plan view of the mechanism shown in Fig. 32.
Fig. 34 is an end view of the upper portion of the mechanism shown in Fig. 32.
Figs. 35, 36 and 37 show in axial section various parts of the mechanism adapted automatically to insert such a further flanged disc base member into one end of a partly finished carton as will be hereinafter more particularly described, various parts of the mechanism being shown in three different positions of operation respectively.
Fig. 38 shows in side elevation mechanism for automatically effecting the removal of finished cartons from their receptacles.
Fig. 39 is a detail view showing in axial section a modified form of expansible mandrel suitable for use in machines according to the invention.
Fig. 40 is an end view of Fig. 39.
Fig. 41 is a similar view to Fig. 40 but with the end of the mandrel shown in the expanded position.
Fig. 42 is a cross section taken on the line X—X of Fig. 39.
Fig. 43 is a cross section taken on the line Y—Y of Fig. 39.
Fig. 44 illustrates diagrammatically an elevational view of a modified form of machine according to the invention, and
Fig. 45 is a diagrammatic plan view of the machine shown in Fig. 44.

Referring to Figs. 1 and 2 of the drawings the particular machine here illustrated comprises a table 1 mounted to rotate about a fixed upstanding column 2, and located a desired distance from the floor level. Beneath the table 1 and rigid therewith is a plate 3 which carries upon its underside twelve depending rollers 4 adapted to co-operate with a cam element 5 turning with a shaft 6. The latter is adapted to be driven by an electric motor which in fact serves to drive the entire machine. The twelve depending rollers 4 are equally spaced apart around the plate 3 and the cam 5 is so shaped as to cause the plate 3 and therefore the table 1 to have imparted thereto a desired intermittent motion consisting of twelve progressive forward movements in the direction of the arrow with a desired interval of rest between each movement during each complete revolution of the table.

The table 1 carries upon its upper face twelve equally spaced apart hollow receptacles 8 to be hereinafter more particularly referred to.

Radially arranged about the table 1 are five spaced apart fixed mechanisms indicated, in general, by the letters A, B, C, D and E.

The mechanism A is adapted automatically to form tubular members from shaped paper sheets, whilst the mechanism B is also adapted to form tubular members from such material. Each of the tubular members produced by mechanism B are adapted to be inserted within the interior of a tubular member produced by the mechanism A in order to form the desired two-part composite tubular member for the body portion of the cartons.

Suitable flanged disc base members are automatically produced by the mechanism C, from strip paper from a roll c, and inserted one into one end portion of each of the composite tubular members. This mechanism also includes means for automatically causing the partial retention of the base member in the tubular member.

Mechanism D serves to automatically cause the complete retention of the said base members in the composite tubular members.

Finally the mechanism E is provided for automatically producing second suitable flanged disc base members from strip paper from a roll e and effecting the insertion into and causing the retention in the composite tubular members of such second base members.

Suitable take-up spools for the scrap strip material leaving the mechanisms C and E can be provided if desired but are not shown on the drawings.

Each of the mechanisms A, B, C, D and E is driven by the motor 7 through the shaft 6 and one or other of the further shafts 9 and 10, whilst in addition the take-up spools aforesaid can also be driven by means of the motor 7 through belt or other transmission means not shown.

The hollow receptacles 8 and the said mechanisms are so relatively arranged that when the table 1 is at rest a receptacle is adjacent each mechanism.

In order that the construction of each mechanism and its manner of operation can be understood it is proposed to follow stage by stage the operation of producing a carton, during a complete revolution of the rotatable table 1.

Figure 3:
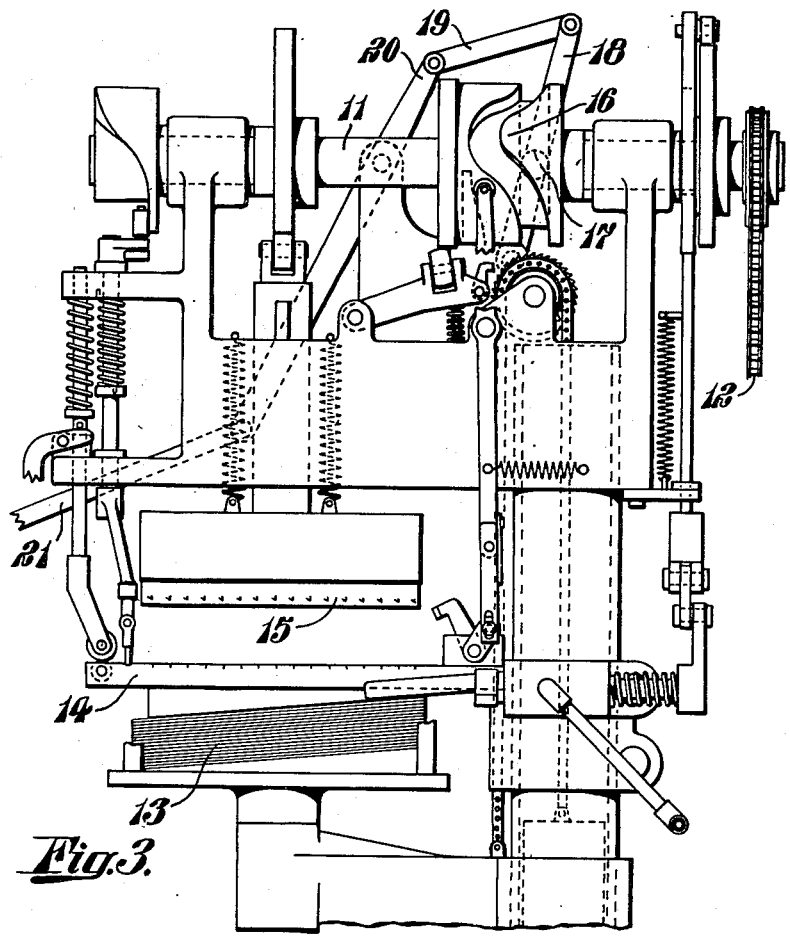
Fig. 3 is a side elevational view of mechanism for effecting the joining of the overlapping edges of a sheet paper blank for the purpose of producing a desired tubular member.
Figure 4:
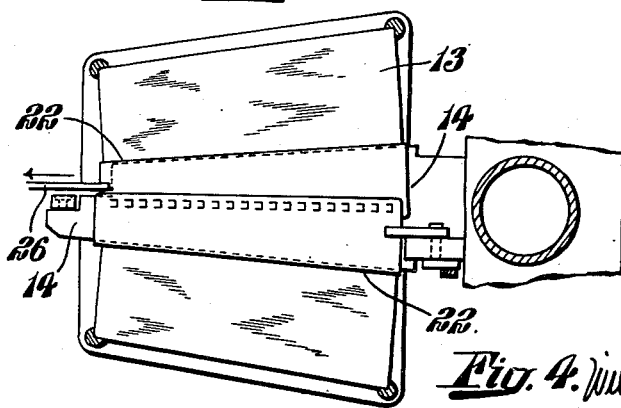
Fig. 4 is a plan view of a portion of the mechanism shown in Fig. 3.

The mechanism indicated at A is shown in greater detail, in Figs. 3 and 4. The construction and operation of this mechanism is fully described in the specification of my British Patent #466,928, and therefore it is proposed in the present instance to deal only with such parts of the mechanism as will render apparent its co-operation with other parts of the machine.

Thus it suffices to mention that the rotation of a shaft 11 by means of a chain 12 from the shaft 9 serves to fold a separate sheet of paper from the pile of blanks 13 around a table-like mandrel 14, the edges of the folded sheet overlapping. These overlapping edges are adapted to be operated upon by a multiple tongued punch 15 co-operating with the mandrel to form a plurality of spaced apart tongues on one thickness which are pressed through correspondingly spaced apertures formed in the other thickness. The two thicknesses are subsequently given relative movement by means to be hereinafter described so that the said tongues are brought into positive engagement with the said apertures and thus effect a satisfactory joining of the edges of the folded sheet to form the desired tubular member.

The shaft 11 carries a cam element 16 with the channel-like track of which a follower 17 on a lever arm 18 is adapted to co-operate for the purpose of imparting a desired to-and-fro movement to a link 21, one end of which is connected to one arm of a double armed lever 20, the other arm of which is coupled by a link 19 to the lever 18.

The other end of the link 21 is connected to mechanism which is indicated in general at F, in Fig. 1. This mechanism F is provided for drawing the tubular member 22 from off the mandrel 14 and transferring it to the hollow bore of a receptacle 8 located adjacent the mechanism A, as well as for giving to the overlapping edges of the member the desired relative movement.

The draw-off mechanism F is shown in greater detail in Figs. 5–11 of the accompanying drawings and this mechanism comprises a member 23 slidably mounted upon a bar 24 which extends outwardly from a bracket 25 mounted upon the centre column 2.

The sliding member 23 carries a fixed outwardly extending arm 26 and a movable arm 27, the latter being pivoted at 28 to the member 23. The outer ends of these arms 26 and 27 come adjacent each other and form gripping jaws.

A lever 29 having a bossed end 30 is pivoted to the slide 23 by a pin 31, the point of pivoting being eccentric with respect to the boss 30. Said boss 30 passes through an aperture 32 of somewhat larger diameter formed in the pivoted arm 27 and acts as a cam to effect an upward movement of said arm about its pivot 28 when the lever 29 is moved to the right about its pivot 31, as will be readily understood upon reference to Fig. 9 of the drawings. Such upward movement of the arm 27 results in the closing of the gripping jaws formed by the outer ends of the arms 26 and 27.

The required movement of the lever 29 is obtained by the to-and-fro movement of the link 21 through a lever 33, pivoted about the boss 30, and a catch pawl 34 which is adapted to engage with the upper end of the lever 29 as shown in Fig. 11. Stop pins 35 and 36 limit the movement of the levers 29 and 33, the lever 29 being normally held against the pin 35 by a spring 37.

It should be noted that the arms 26 and 27 are located in line with the bore of the hollow receptacle 8 adjacent the mechanism A. Thus when the link 21 is first moved to the left from the position shown in Figs. 5 and 7, the lever 33 will be brought against the stop pin 35 (see Fig. 10) and hence further movement of the link 21 to the left will cause the member 23 to slide along the bar 24. The gripping jaws will pass through the bore of the receptacle 8 and come to rest at a position where they embrace the end of one of the over-lapping edges of the tubular member 22 (see Figs. 4 and 6), located on the mandrel 14 of mechanism A.

Now during the first part of the return movement of the link 21 from the position shown in Fig. 6, the lever 33 is moved to the right about its pivot and causes the pawl 34 to engage with the lever 29 and thus moves the latter also to the right about its pivot 31. Such movement causes the gripping jaws to close and grip the end of one of the overlapping edges of the tubular member 22 as is clearly shown in Fig. 11.

The further return movement of the link 21 serves to traverse the slide 23 back along the rod 24 and so effects the drawing of the tubular member from off the mandrel 14 of mechanism A and the insertion of said tubular member into the bore of the adjacent receptacle 8.

It is to be understood that during such drawing-off of the tubular member 22 the overlapping edges thereof are given the desired relative movement in the manner fully set forth in the specification of my hereinbefore mentioned British Patent #466,928.

When the tubular member 22 is in the required position within the said receptacle 8, the gripping jaws are adapted to be opened to release the member. This release is effected by providing the pawl 34 with a depending arm 37 which at a desired point along the return movement of the slide comes against a releasing plate 38 and causes the disengagement of the pawl from the lever 29, which latter in turn, permits the arm 27 to descend and thus open the gripping jaws.

The final return movement of the slide to the position shown in Fig. 5 is effected by reason of the lever 33 bearing against the stop 36.

The hollow receptacle 8 carried by the table 1 is illustrated in greater detail in Figs. 12, 13 and 14. This device comprises a hollow body portion 39 fixed to the table 1 and carrying a rotatable liner 40 having a taper bore which corresponds for the greater portion of its length with the tapered tubular member (22) it is adapted to receive and support. The forward end of the taper bore is somewhat enlarged at 41 to permit of a free and uninterrupted entry of the tubular member.

Said rotatable liner 40 is provided at its forward end with a toothed wheel 42 which is adapted to engage with a correspondingly toothed fixed rack 43 arranged adjacent the edge of the rotatable table 1, (see also Fig. 1), the purpose of which will be hereinafter described.

The general form of the tapered tubular member 22 after it is inserted in the receptacle is illustrated in perspective in Fig. 15 and it will be observed that the overlapping joined edges are located in an uppermost position.

Following the foregoing operations the table 1 is given two intermittent periods of rotation in order to bring the particular receptacle 8, supporting the tubular member 22, adjacent the mechanism B, and during this transfer movement of the receptacle 8 the toothed wheel 42 is brought into engagement with the rack 43 and rotates the liner 40 through 180° in the direction of the arrow (Fig. 12) and also of course the tubular member 22, so that when the receptacle is adjacent the mechanism B, the overlapping edges of the tubular member are located in a lowermost position.

The liner 40 is provided with two diametrically opposed cavities 44 with which a spring pressed ball 45 carried in the body 39 is adapted to co-operate and hold the liner locked against accidental displacement from either of two positions.

The mechanism indicated at B (Fig. 1) is in all respects similar to that hereinbefore described and designated A, and is adapted automatically to produce tubular members from sheet paper blanks which are similar, though somewhat smaller in diameter, to that previously designated 22.

This mechanism B is driven by a chain 46 from the shaft 10.

A tubular member produced by this mechanism B is adapted to be drawn from off the mandrel and inserted within the interior of the aforesaid tubular member 22, supported in the receptacle 8, by draw-off mechanism indicated at G, (Fig. 1), which is identical with the mechanism hereinbefore designated F.

The two tubular members when located the one within the other constitute a two-part composite tubular member as is shown in perspective in Fig. 16 and it should be observed that the overlapping joined edges of the one-part are located diametrically opposite the overlapping joined edges of the other part. This composite tubular member is designated 47.

In some cases the plurality of spaced apart tongues of each of the tubular members extend through the appropriate apertures to the interior of the member, but in other cases the tongues of the inner tubular member can extend through the appropriate apertures to the exterior of this particular member, in which latter case the interior of the composite two-part tubular member can be entirely free from inwardly extending projecting parts.

After this composite tubular member has been produced the table 1 is again given two intermittent periods of rotation by means of the cam 5 in order to bring the said member, supported by the particular receptacle 8, to a position adjacent the mechanism indicated at C, (Fig. 1).

It is convenient at this point to mention that during the time the table 1 is at rest between the two intermittent periods of rotation, the outer end of the composite tubular member 47 may have its shape confirmed and if desired be expanded or opened out so as to ensure the reception therein, without fouling, of a flanged disc. For instance a coned or expanding mandrel may be adapted to be inserted into the open outer end of the composite member. This mechanism is not shown on the drawings.

The mechanism C is illustrated in greater detail in Figs. 17 and 18 of the accompanying drawings and includes two principal devices, namely, means for producing flanged discs from the paper strip from the roll c (Fig. 1), and secondly means for inserting such discs into the end of the composite tubular members. A portion of the first of these devices is also illustrated in Figs. 19, 20 and 21, which show the various parts thereof at different stages of operation.

This mechanism has a main operating shaft 49 driven by a chain 50 from the shaft 10. The shaft 49 has mounted thereon an eccentric 51 around which is a co-operating strap 52 that forms part of a connecting rod 53 serving to transmit reciprocating motion to a slide 54 mounted in the general framework 55.

The slide 54 carries at its inner end a hollow cutting punch 56 which is adapted to co-operate with the cutting edge 57 of a fixed ring die 58 for the purpose of cutting a circular disc from paper strip $c^1$ which is intermittently fed between the punch and die from the roll c by means of rollers 59 between which it is clamped. These rollers 59 are adapted to be operated at the appropriate times by means of a lever and linkage system 60 from the movement of the slide 54.

After the cutting of the circular disc from the paper strip $c^1$ the punch 56 continues to move inwardly against the opposing action of a pressure ring 61, which latter is under the influence of a compression spring 62. This further movement of the punch 56 serves to turn up the edge portion of the circular disc to form a flange, as will be readily appreciated upon reference to Fig. 20; the flanged disc thus produced being indicated at 63. During the first portion of the outward movement of the punch 56 the pressure ring 61 moves the flanged disc 63 from off the mandrel portion 64; the flanged disc being then carried by the punch 56 as is shown in Fig. 21. Further outward movement of the punch 56 causes a plunger 65 to eject the flanged disc from the punch, after which said disc descends a guide or chute indicated in dotted lines at 66 (Fig. 17) to the device adapted to insert it into the inner end of the composite tubular member 47.

This latter device and the method of operation thereof are illustrated in greater detail in Figs. 22, 23 and 24, and comprises a fixed main body portion 67 mounted upon the underside of the framework 55 and provided with a cylindrical bore 68 within which is slidably arranged a sleeve member 69. Within this sleeve member is arranged an axially movable rod 70, the inner end of which is coupled at 71 to the lower arm of a lever 72 pivoted at 73 to the framework. The upper arm of this lever 72 is connected by a coupling rod 74 to the slide member 54 aforesaid. By this means the axially movable rod 70 is adapted to receive a desired reciprocating motion from the movement of the slide 54.

A compression spring 75 serves to couple the rod 70 and the sleeve 69 and during movement of said rod (to the right) from the position shown in Fig. 22 to that shown in Fig. 23, the sleeve is similarly moved through the action of the spring until it is stopped by reason of the outer portion of a stop-ring 76 coming into contact with the body 67. During this movement of the sleeve 69, the outer end portion of an expansible mandrel 77, engages with the flanged disc 63, (which has descended from the punch 56), and carries this disc into the interior of the composite tubular member 47 which is supported in the receptacle 8. (See Fig. 23.)

Further similar movement of the rod 70 functions to cause the outer end thereof, which is coned at 78, to bring about the expansion of the mandrel 77, the outer portions of which latter consequently force the flange of the disc 63 into intimate contact with the inside wall of the tubular member 47. This action will be readily understood upon reference to Fig. 24, which shows the mandrel 77 in its expanded position.

Such further movement of the rod 70 also brings about relative movement between a collar 79 and the sleeve 69. Said collar 79 is rigidly connected to the rod 70 by means of the bar 80 and serves to operate an iris carried by the outer end of the sleeve 69. This iris comprises a plurality of pivotally mounted segmental elements 81 positioned around the sleeve 69 and each formed with two relatively inclined surfaces 82 and 83 respectively. Normally, and as shown in Figs. 22 and 23, an inwardly extending portion of the collar 79 bears against the surface 82 and maintains each element in "open" position, whilst upon such relative movement of the collar 79 and sleeve 69 the said inwardly extending portion is moved on to the surface 83 and causes each iris element to "close" with the result that the outer ends of the elements turn in the end portion of the composite tubular member, which will be appreciated upon reference to Fig. 24.

Following these operations the rod 70 is returned (moved to the left) and the parts moved to their normal positions as indicated in Fig. 22. During this return movement the iris elements 81 are "opened" and the outer end of the mandrel withdrawn, after its contraction, from the composite tubular member 47.

It should be noted that during the time that the flanged disc 63 is being inserted, a plate 84 carried by the slide 54 serves to "hold-up" the outer end of the composite tubular member 47 against outward axial thrust.

In the foregoing manner the desired base member is automatically produced and inserted into the composite tubular member and caused to be retained thereby prior to subsequent operations.

The table 1 is now once more given the desired movements to bring the particular receptacle 8 supporting the partly finished carton to a position adjacent the mechanism D, Fig. 1. This mechanism D is illustrated in greater detail in Figs. 25, 26 and 27; Fig. 25 also showing a portion of the rotatable table 1 and various associated parts.

In this case, the shaft 10 rotates a simple cam member 86 with which co-operates a follower 87 carried by an upwardly extending rod 88. The upper end of this rod 88 is connected to one arm of a bell crank lever 89 pivoted to a framework 90, whilst the other arm of said lever is coupled by a rod 91 to the upper arm of a further lever 92 also mounted in the framework 90.

Said framework also carries a bored body 93 which forms the carrier for a device adapted to complete the retention of the flanged disc within the end of the composite tubular member. This device and its mode of operation is shown more fully in Figs. 28-31, of the accompanying drawings.

Within the body 93 there is arranged a slidable sleeve 94 having upon its interior an inwardly extending web 95. The sleeve 94 carries within its interior a rod 96 having an enlarged portion 97 and provided at its outer end with a plunger-like part 98. The inner or outer end of this rod 96 is coupled at 99 to the lower arm of the lever 92 aforesaid so that movement initiated by the cam 86 is transmitted through the members 87, 88, 89, 91 and the said lever 92 to the rod 96 which is adapted to receive a reciprocating motion.

During the first portion of the advance movement of the rod 96 (towards the right) it functions, through the intermediary of a compression spring 100, also to move the sleeve member 94 towards the right until such movement of the sleeve is arrested by a stop ring 101 abutting against a portion of the body 93. The parts of the device now occupy the relative positions shown in Fig. 29.

The sleeve 94 carries at its outer end an iris consisting of a plurality of pivotally mounted segmental elements 102 which are positioned around the sleeve and held in place by means of resilient ring members 103. The inner wall of each of these iris elements 102 is formed with two spaced apart relatively inclined surfaces 104 and 105 respectively with which the aforesaid plunger-like part 98 of the rod 96 is adapted to co-operate.

The normal position of the iris elements 102 and the co-operating plunger part 98 is shown in Figs. 28 and 29. However, upon further advance movement of the rod 96 the plunger portion 98 is moved to a position intermediate the two relatively inclined surfaces 104, 105 of each of the iris elements, whereupon the outermost of the resilient ring members 103 serves to "close" the iris elements and in so doing effects a still further turning in of the end portion of the composite tubular member 47 supported in the receptacle 8. This operation will be readily understood upon reference to Fig. 30 of the accompanying drawings.

Still further advance movement of the rod 96 will bring the plunger part 98 into engagement with the surfaces 105 of the iris elements 102 and continuation of such movement will "open" the iris and permit the passage therethrough of the said plunger part 98, which continues its advance movement for the purpose of folding in the end portion of the composite tubular member over the inside surface of the flange portion of the flanged disc 63. It is believed that this latter operation will be readily understood by reference to Fig. 31.

The return movement of the rod 96 will of course withdraw the plunger-like part 98 from within the end of the partly finished carton and return the various parts to their normal position as shown in Fig. 28.

It is desirable to state that the composite tubular member and its single base member may if required be removed from the machine at this stage and pass, if desired, to suitable waxing apparatus to form a finished carton, but however, it is preferable to insert a further base member as will be hereinafter described.

This mechanism D also includes means for assuring the correct registration of each of the plurality of receptacles 8 with the various co-operating parts of the radially arranged mechanisms when such receptacles come to rest adjacent the said mechanisms. For this purpose each of the receptacles 8 is provided with a member having a V shaped gap 106 formed therein and with which is adapted to engage when the receptacles 8 are at rest during the intermittent periods of rotation, a sliding plunger element 107 (see Figs. 25 and 27). This sliding plunger element 107 is connected by means of a pin and slot connection, to a slide 108 which is connected by means of a link to the lower arm of the lever 92 aforesaid, with the result that during the oscillation of the said lever 92 the slide 108 is reciprocated and serves to engage plunger 107 with and disengage it from the V shaped gap 106 at the desired appropriate times, thus holding each of the receptacles 8 steady and in register with the various co-operating parts of the plurality of mechanisms.

There is also incorporated in the mechanism a "hold-up" plate 109 for the purpose of preventing unintentional movement of the composite tubular member during the operation of inserting a flanged disc member, said plate being slidably arranged on the frame 90 and is adapted to engage with the outer end of the composite tubular member 47 during the time that the plunger part 98 is operating at the inner end of said tubular member. Said plate 109 is adapted to be moved towards the tubular member 47 by means of a depending bar 110 carried by the rod 91 and adapted to contact with a spring loaded bolt 111 carried in association with the plate 109.

Following the aforesaid operations the table 1 is given the desired movements in order to bring the particular receptacle 8 supporting the partly finished carton to a position adjacent the mechanism E, Fig. 1. This mechanism E is adapted to produce further flanged disc members from the roll of paper strip e, to insert one of said flanged discs into the base of the partly finished carton and effect the retention of said disc in said base. The mechanism, which is illustrated in greater detail in Figs. 32, 33 and 34, of the accompanying drawings, driven from the shaft 9 by means of a chain 113 is in general similar to the hereinbefore more particularly described mechanism designated C. In fact the means and method of producing the desired flanged disc members are identical with that shown in Figs. 19, 20 and 21, with the exception that the dimensions of certain parts are modified in order to produce a flanged disc of somewhat smaller dimensions. In view of this fact it is believed to be unnecessary to give further description concerning the production of these second flanged disc members by the mechanism at present being referred to, except to mention that the said flanged discs when produced are delivered by a guide or chute indicated at 114 (Fig. 32), to a position adjacent the inner end of the partly finished carton supported in the particular receptacle 8.

However, in order that the various similar parts of this particular mechanism may be conveniently recognized, such parts are indicated by reference numerals which have a value ten times that of corresponding numerals shown in Figs. 17, 18, 19, 20, 21, 22, 23 and 24.

Furthermore, the means incorporated in this mechanism for the purpose of inserting the second flanged disc and for causing the retention of said disc in the base or end of the partly finished carton is also similar to the device previously described with reference to Figs. 22, 23 and 24, with the exception that in the present instance the iris device is omitted. Here again it is deemed unnecessary to include any further description of the method of operation of this particular device which is shown in greater detail in Figs. 35, 36 and 37, except to mention that during the movement of the rod 700 to the right the second flanged disc indicated at 115 is carried within the base portion of the partly finished carton, as is clearly indicated in Fig. 36, whilst upon further movement of the rod 700 to the right the expanding mandrel 770 is expanded to force the flange portion of the disc 115 into intimate contact with the folded in end portion of the composite tubular member aforesaid, after which operation the rod 700 is returned to its normal position, thereby effecting the withdrawal of the mandrel from the base of the carton.

During the time that the mandrel 770 is operating in association with the base of the partly finished carton a "hold-up" plunger 116 carried by a slide 117 is adapted to be inserted through the outer open end of the partly finished carton and to abut against the inside face of the first flanged disc member. The desired movement of the slide 117 is obtained by means of a lever 118 operating in cooperation with a cam 119 rotated by the shaft 9 which latter is driven by the electric motor 7 through the gear and chain drive indicated in Fig. 2.

The desired carton is now completed insofar as its construction is concerned, but of course if desired, and it is usually preferable, the structure may be treated with paraffin or other wax in any desired suitable apparatus.

Although it is possible readily to remove the finished cartons from the receptacles 8 manually, automatically operating means can be incorporated for effecting this operation. Thus, the machine now being described incorporates means shown in Figs. 1, 17, 18 and 38 which comprises a slidably carried plunger 120, which is adapted to have imparted thereto the required reciprocating motion by means of a link 121 in association with a lever 122, which latter is itself operated by the reciprocating motion of the connecting rod 74 forming part of the mechanism C aforesaid. In operation the plunger 120 is adapted to engage with the base portion of a carton supported in the particular adjacent receptacle 8 and to cause the ejection of said carton from the receptacle.

The cartons thus ejected may if desired be transferred to a movable band or other conveyor which if desired can be arranged to deliver them to suitable waxing apparatus.

When a finished carton has been removed from the receptacle in which it has been supported the then vacant receptacle again passes to the mechanism A (Fig. 1), and the production of another carton is commenced.

Thus, in the particular machine hereinbefore described, 12 cartons are produced for each revolution of the table, it of course being understood that the table and the various mechanisms are so interconnected and their relative operating times so adjusted that the entire machine is adapted for continuous operation.

Either one or both of the expansible mandrels 77 and 770 which have been hereinbefore described can, with certain advantages, be replaced by the two-part expansible mandrel structure shown in Figs. 39–43.

In this particular arrangement the expansible mandrel consists of two sleeve members, an inner one 123 and an outer one 124. Each of these sleeve members has four spaced apart longitudinally extending slots 125 and 126 respectively, thus providing four segmental outer end portions for each member.

The inner end of the sleeve member 124 is secured to a slidably arranged member 127 which corresponds to the members 69 and 690 hereinbefore described and serves to clamp the sleeve member 123 in position through the intermediary of a nut 128.

An axially movable rod 129 which corresponds to the hereinbefore described rods 70 and 100 is provided and has a coned end 130 which, when the rod is given the appropriate forward axial movement, co-operates with the coned inner surface 131 of the end of the sleeve 123 and causes the segmental portions of this sleeve to move radially outwardly. This movement of the segments of the sleeve 123 serves to correspondingly move the segments of the outer sleeve 124, with the result that the operative end portion of the mandrel is brought to an expanded position as is indicated in Fig. 41.

Upon retraction of the rod 129 the segmental portions of both sleeve members will return to their normal position due to the natural resiliency of the metal of which these members are formed.

The principal advanage of this particular form of expansible mandrel resides in the fact that when in the expanded position (Fig. 41) the circumferential surface of the operative portion is continuous, that is to say the gaps due to the slots 126 are filled by portions of the segments of the inner sleeve so that in operation the mandrel will function to expand the flanged portion of a flanged base member without undesirably marking the flange.

There is shown in Figs. 44 and 45 a modified embodiment of the invention wherein, as an alternative to arranging the various mechanisms radially with respect to a rotatable table as hereinbefore described, such mechanisms are disposed alongside a fixed support over which travels, with an intermittent progressive motion, an endless band system carrying a plurality of hollow receptacles in which cartons are adapted to be produced.

This particular machine camprises a fixed support 132 adjacent each end of which is mounted a rotatable drum 133. Between these drums is arranged an endless band or chain system 134 upon which a plurality of spaced apart hollow receptacles 135 is carried. These hollow receptacles correspond to the receptacles 8 hereinbefore described.

The arrangement is such that the upper run of the endless band system travels along the upper surface of the support 132 and is adapted to receive an intermittent progressive movement from an electric motor 136 through suitable gear and transmission mechanism arranged within a casing 137.

The receptacles 133 are each adapted to be brought, by such intermittent movement into a position adjacent each of a plurality of co-operative mechanisms A', B', C', D' and E'. These mechanisms correspond exactly so far as their functions are concerned with the mechanisms designated A, B, C, D and E which have been hereinbefore described in detail.

With this arrangement, a carton formed in each of the receptacles 133 during the progress of the latter along the support 132 is adapted to be withdrawn either by hand operation or automatically after the receptacle has left the mechanism E' and before said receptacle returns for further co-operation with the mechanism A'.

This modified form of machine is particularly advantageous where space is limited as it is possible to arrange a plurality of such machines side by side upon a minimum of floor space.

As an alternative to transferring the constituent parts of the cartons to the various mechanisms, said mechanisms can themselves be moved in order to perform their allotted functions in building up a complete carton or cartons at a particular fixed point or points.

It is to be understood that the invention is not limited in any way to the hereinbefore contained particular description of a construction of the actual mechanisms or parts for performing the various operations and that such mechanisms may be of any other desirable form and co-operate in any other suitable mechanical way to enable the various steps of the operation of producing desired cartons to be carried into effect with the greatest efficiency. Moreover such mechanisms may be varied according to the nature of the material from which desired cartons are to be made or the precise shaping of the desired cartons.

Again where required various parts or portions of the machine may be made removable and if desired interchangeable so that they may be replaced by other portions of the same or differing sizes. Further, certain parts or portions of the machine may be made adjustable in order that the production of different sized and/or shaped cartons or the like may be undertaken when required.

Further the relatively fixed parts of the machine may be set into motion by the relatively movable parts thereof, by cam, link and lever, gear or other mechanism alone or in any desired combination. Thus for instance in the case of a movable circular table machine, the movements for the parts on the table may be transmitted from the interior or from the exterior or both and some or all of the mechanisms may be arranged above the table, or some or all arranged below the table.

It should be observed that machines constructed and arranged according to the invention are capable of producing cartons or the like from sheet and/or strip material without the aid of an adhesive of any nature.

The invention is not limited to the precise forms or details of construction described, as these may be varied to suit particular cases without departing from the scope of the appended claims.

What I claim and desire to secure by Letters Patent of the United States of America is:—

1. A machine for use in manufacturing cartons from sheet and/or strip material and which comprises a tubular member consisting of a double thickness of such material, including two separate mechanisms each adapted automatically to form tubular members from such material, means for automatically effecting the transfer of a tubular member formed by one of said mechanisms to a position at which it is adapted to be inserted into a tubular member formed by the other mechanism so as to produce a composite tubular member and means for imparting a partial relative rotation between the two tubular members during such transfer operation for the purpose of assuring that the seams or joins in the tubular members are displaced in relation to each other.

2. A machine for use in manufacturing cartons from sheet and/or strip material and which comprises a tubular member consisting of a double thickness of such material, including a movable table, mechanism arranged adjacent said movable table and adapted automatically to form tubular members from such material, a second mechanism adapted automatically to form tubular members from such material and also arranged adjacent said movable table, a plurality of receptacles on said movable table, means for transferring a tubular member produced by the first mentioned mechanism from said mechanism to the interior of a receptacle, means for moving said table to transport this tubular member in the receptacle to a position suitable for it to receive into its interior a tubular member formed by the second mentioned mechanism, means for removing from this second mentioned mechanism a tubular member produced thereby and inserting it within the interior of the tubular member carried by the receptacle and means for imparting relative rotation between said tubular members during the said transportation movement of the table in order to assure that the seams or joins in the two tubular members are displaced in relation to each other.

3. A machine for use in manufacturing cartons from sheet and/or strip material and which comprise a tubular member consisting of a double thickness of such material, as claimed in claim 2 including mechanism arranged adjacent the movable table and adapted automatically to effect the insertion into each of the composite tubular members of a base member and for automatically causing the retention of said base member in said composite tubular member.

4. A machine for use in manufacturing cartons from sheet and/or strip material as claimed in claim 2 wherein each receptacle is rotatably mounted upon the movable table and means are provided for imparting rotary movement to each receptacle, in turn, upon movement of the table.

5. A machine for use in manufacturing cartons from sheet and/or strip material as claimed in claim 2 wherein each receptacle is rotatably mounted upon the movable table and incorporates in a toothed wheel, a fixed toothed rack is provided for cooperation with said toothed wheel, and said wheel and toothed rack are adapted to co-operate upon movement of the table to effect a partial rotation of the receptacle.

6. A machine for use in manufacturing cartons from sheet and/or strip material as claimed in claim 2 comprising a rotatable table, means for effecting a progressive step by step rotation of said rotatable table, a plurality of spaced apart fixed mechanisms radially arranged about said rotatable table, said mechanisms including means for forming tubular members from such material, means for inserting a tubular member within another tubular member, to constitute a composite tubular member, means for automatically producing flanged disc base members from such material and means for automatically inserting into each of the composite tubular members a base member so produced and automatically causing the retention of this base member in the composite tubular member.

7. A machine for use in manufacturing cartons from sheet and/or strip material as claimed in claim 2 wherein the movable table is constituted by an endless band or chain system.

WILLIAM JOSEPH BUTLER.